US012038299B2

(12) United States Patent
Carbune et al.

(10) Patent No.: US 12,038,299 B2
(45) Date of Patent: Jul. 16, 2024

(54) CONTENT-AWARE NAVIGATION INSTRUCTIONS

(71) Applicant: GOOGLE LLC, Mountain View, CA (US)

(72) Inventors: Victor Carbune, Zurich (CH); Matthew Sharifi, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 699 days.

(21) Appl. No.: 17/273,672

(22) PCT Filed: Oct. 22, 2020

(86) PCT No.: PCT/US2020/056756

§ 371 (c)(1),
(2) Date: Mar. 4, 2021

(87) PCT Pub. No.: WO2022/086528

PCT Pub. Date: Apr. 28, 2022

(65) Prior Publication Data

US 2022/0299335 A1 Sep. 22, 2022

(51) Int. Cl.
*G01C 21/36* (2006.01)
*G10L 15/05* (2013.01)
*G10L 15/22* (2006.01)

(52) U.S. Cl.
CPC ..... *G01C 21/3629* (2013.01); *G01C 21/3655* (2013.01); *G10L 15/05* (2013.01); *G10L 15/22* (2013.01)

(58) Field of Classification Search
CPC . G01C 21/3629; G01C 21/3655; G10L 15/05; G10L 15/22; G10L 13/033; G10L 25/48
See application file for complete search history.

(56) References Cited

U.S. PATENT DOCUMENTS 9,087,508 B1 * 7/2015 Dzik ........................ G09B 5/04
9,354,074 B2 5/2016 Azose et al.
(Continued)

FOREIGN PATENT DOCUMENTS

JP 2010-117476 A 5/2010
JP 2011-095142 A 5/2011
(Continued)

OTHER PUBLICATIONS

International Search Report and Written Opinion for Application No. PCT/US2020/056756, dated Jun. 23, 2021.
(Continued)

*Primary Examiner* — Russell Frejd
(74) *Attorney, Agent, or Firm* — MARSHALL, GERSTEIN & BORUN LLP

(57) ABSTRACT

To provide content-aware audio navigation instructions, a client device executing a mapping application obtains one or more audio navigation directions for traversing from a starting location to a destination location along a route. The client device also identifies electronic media content playing from a source different from the mapping application which is executing at the client device or in proximity to the client device. The client device determines characteristics of the electronic media content and adjusts the audio navigation directions in accordance with the characteristics of the electronic media content. Then the client device presents the adjusted audio navigation directions to a user.

18 Claims, 4 Drawing Sheets

300

310 Audio Content Characteristics — 320 Audio Navigation Instruction Parameters

| Audio Content | Speed | Language | POI | Length | Relevance Level | Maneuver Type | Location | Complexity Level | Adjustment |
|---|---|---|---|---|---|---|---|---|---|
| Joe's Coffee Ad | 1x | English | Joe's Coffee | 30 seconds | Low | Left Turn | Corner of State and Main | Low | Recommend a Detour to Joe's Coffee After Ad Ends |
| Sports Podcast | 1.5x | English | None | 2 minutes | Low | Right Turn | Corner of Lake and Elm | Low | Change Speed of Audio Instructions to 1.5x, Recite Instruction After End of Sentence |
| Music | 1x | Spanish | | 10 minutes | Low | Highway Exit | Corner of Oak and Maple | High | Change Language of Audio Instructions to Spanish |
| News Podcast | 2x | Hebrew | | 5 minutes | High | Merge | Corner of Main and Oak | Low | Change Speed of Audio Instructions to 2x, Change Language to Hebrew |

(56) References Cited

U.S. PATENT DOCUMENTS

| | | | | |
|---|---|---|---|---|
| 9,576,574 | B2 | 2/2017 | van Os | |
| 10,137,902 | B2 | 11/2018 | Juneja et al. | |
| 10,261,564 | B1 * | 4/2019 | Gollakota | G06F 1/3265 |
| 10,701,510 | B2 * | 6/2020 | Norris | H04S 7/304 |
| 11,725,957 | B2 * | 8/2023 | Padegimaite | G01C 21/3629 701/431 |
| 2011/0301728 | A1 | 12/2011 | Hamilton et al. | |
| 2015/0106012 | A1 | 4/2015 | Kandangath et al. | |
| 2015/0276421 | A1 * | 10/2015 | Beaurepaire | G01C 21/3697 701/400 |
| 2016/0259027 | A1 * | 9/2016 | Said | H04W 4/029 |
| 2018/0335312 | A1 | 11/2018 | Bennett et al. | |
| 2021/0404833 | A1 * | 12/2021 | Padegimaite | G01C 21/3629 |
| 2023/0168101 | A1 * | 6/2023 | Carbune | G01C 21/3629 701/424 |

FOREIGN PATENT DOCUMENTS

| | | | |
|---|---|---|---|
| JP | 2019-117324 | A | 7/2019 |
| WO | WO-2013/184473 | A2 | 12/2013 |
| WO | WO-2015/103457 | A2 | 7/2015 |
| WO | WO-2020/091806 | A1 | 5/2020 |

OTHER PUBLICATIONS

Japanese Patent Application No. 2023-519747, Notice of Reasons for Rejection, mailing date of Apr. 22, 2024.

* cited by examiner

300

| 310 Audio Content Characteristics | | | | | 320 Audio Navigation Instruction Parameters | | | | |
|---|---|---|---|---|---|---|---|---|---|
| Audio Content | Speed | Language | POI | Length | Relevance Level | Maneuver Type | Location | Complexity Level | Adjustment |
| Joe's Coffee Ad | 1x | English | Joe's Coffee | 30 seconds | Low | Left Turn | Corner of State and Main | Low | Recommend a Detour to Joe's Coffee After Ad Ends |
| Sports Podcast | 1.5x | English | None | 2 minutes | Low | Right Turn | Corner of Lake and Elm | Low | Change Speed of Audio Instructions to 1.5x, Recite Instruction After End of Sentence |
| Music | 1x | Spanish | | 10 minutes | Low | Highway Exit | Corner of Oak and Maple | High | Change Language of Audio Instructions to Spanish |
| News Podcast | 2x | Hebrew | | 5 minutes | High | Merge | Corner of Main and Oak | Low | Change Speed of Audio Instructions to 2x, Change Language to Hebrew |

FIG. 3

CONTENT-AWARE NAVIGATION INSTRUCTIONS

FIELD OF THE DISCLOSURE

The present disclosure relates to content-aware navigation instructions and, more particularly, to adjusting audio navigation instructions based on other media/audio content playing within the area or on the same device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, software applications executing in computers, smartphones, etc. or embedded devices generate step-by-step navigation directions. Typically, a user specifies the starting point and the destination, and a software application displays and/or presents the directions in an audio format immediately and/or as the user travels from the starting point and the destination.

These software applications generally utilize indications of distance, street names, building numbers, to generate navigation directions based on the route. For example, these systems can provide to a driver such instructions as "proceed for one-fourth of a mile, then turn right onto Maple Street."

SUMMARY

Audio instructions provided by in-vehicle navigation systems generally have to be informative and provide sufficient, well-timed instruction for the route to be followed without unnecessarily distracting those listening, particularly the driver. Additionally, as other audio is playing within the vehicle at the same time as the audio instructions, in-vehicle navigation systems generally have to compete for the driver's attention. The combination of multiple audio outputs can lead to a suboptimal experience where the user cannot hear the navigation instructions or fails to understand the navigation instructions. The other audio within the vehicle may also provide information indicative of the driver's preferences, such as the driver's preferred language, the driver's preferred speed of audio playback, preferred destinations for the driver, etc. As such, an improved system-user audio interface may be beneficial that is deeply integrated with other media content playing during navigation, and provides audio instructions which are adapted in accordance with the other audio playing within the vehicle.

In some implementations, a mapping application that presents audio navigation instructions may identify other media/audio content playing in the area or on the same device (e.g., in the same vehicle, in the same room, in an outdoor area within a threshold distance of the application, etc.). The mapping application may then adjust the audio navigation instructions in accordance with the media/audio content. For example, when the media/audio content is an audio book, podcast, music, etc., the mapping application may wait to provide an upcoming navigation instruction until there is a break in the media/audio content. More specifically, the mapping application may play the upcoming navigation instruction after the end of a segment, the end of a song, or the end of a sentence. In another example, when the media/audio content is presented in a particular language (e.g., Spanish), the mapping application may present the audio navigation instructions in that language. In yet another example, the mapping application may provide suggestions or recommendations for points of interest (POIs) along the route which are mentioned in the media/audio content.

To identify the other media/audio content playing in the area, the mapping application may communicate with other applications executing on a client device, for example, via an application programming interface (API). The other applications executing on the client device may provide audio playback data including characteristics of the media/audio content being played by the other applications, such as the speed (i.e., the rate of speech) at which the other applications are being played (e.g., 1.5×, 2×, etc.), the language of the media/audio content, characteristics of the voice of the speaker in the media/audio content, a transcript of the media/audio content, the length of the media/audio content, etc. Additionally, the mapping application may communicate with other devices playing media/audio content (e.g., a vehicle head unit), such as via a short-range communication link. The other devices may also provide audio playback data including characteristics of the media/audio content to the mapping application. Still further, the mapping application may identify the other media/audio content by comparing audio fingerprints of predetermined media/audio content to ambient audio in the surrounding area. For example, the mapping application may obtain a library of audio fingerprints corresponding to media/audio from popular music, audio books, radio shows, podcasts, etc. If the mapping application identifies a match with one of the audio fingerprints, the mapping application may determine that media/audio content is being presented in the area.

The mapping application may then identify characteristics of the media/audio content by communicating with the application or a device presenting the content to receive metadata associated with the content or by analyzing the media/audio content using speech recognition techniques.

One example embodiment of the techniques of this disclosure is a method for generating content-aware navigation instructions. The method includes obtaining, in a client device via a mapping application, one or more audio navigation directions for traversing from a starting location to a destination location along a route, identifying electronic media content playing from a source different from the mapping application, the source executing at the client device or in proximity with the client device, and determining characteristics of the electronic media content. The method further includes adjusting at least one of the one or more audio navigation directions in accordance with the characteristics of the electronic media content, and presenting the at least one adjusted audio navigation direction to a user.

Another example embodiment of the techniques of this disclosure is a client device for generating content-aware navigation instructions. The client device includes a speaker, one or more processors, and a non-transitory computer-readable memory coupled to the one or more processors and the speaker and storing instructions thereon. The instructions, when executed by the one or more processors, cause the client device to obtain, via a mapping application, one or more audio navigation directions for traversing from a starting location to a destination location along a route, identify electronic media content playing from a source different from the mapping application, the source executing at the client device or in proximity with the client device, and determine characteristics of the electronic media content. The instructions further cause the client device to adjust at least one of the one or more audio navigation directions in accordance with the characteristics of the electronic media content, and present, via the speaker, the at least one adjusted audio navigation direction to a user.

Yet another example embodiment of the techniques of this disclosure is non-transitory computer-readable memory storing instructions thereon. The instructions, when executed by one or more processors, cause the one or more processors to obtain, via a mapping application, one or more audio navigation directions for traversing from a starting location to a destination location along a route, identify electronic media content playing from a source different from the mapping application, the source executing at the client device or in proximity with the client device, and determine characteristics of the electronic media content. The instructions further cause the one or more processors to adjust at least one of the one or more audio navigation directions in accordance with the characteristics of the electronic media content, and present, via a speaker, the at least one adjusted audio navigation direction to a user.

The methods described herein improve the output of audio navigation directions by taking the audio characteristics of other media (audio) content into account. The methods describe various manners of adjusting the output of the audio navigation directions such that they are more easily understood by a listener following the audio navigation directions. This improved clarity and comprehension means that the audio navigation instructions are safer. For example, the audio navigation directions may be adjusted to match a characteristic of the media content, such as the language, or their output may be delayed/adjusted to occur at a time matching a natural break in the media content, such as at the end of a sentence. As another example, the media content may be paused to allow output of the audio navigation instructions, therefore avoiding audio overlap. These and other examples will be described below.

BRIEF DESCRIPTION OF THE DRAWINGS

FIG. 3 is an example navigation instruction data table which the content-aware audio navigation generation system of FIG. 2 can utilize to adjust navigation instructions in accordance with particular media content;

DETAILED DESCRIPTION

Overview

Generally speaking, the techniques for providing content-aware navigation instructions can be implemented in one or several client devices, a vehicle head unit, one or several network servers, or a system that includes a combination of these devices. However, for clarity, the examples below focus primarily on an embodiment in which a client device executing a mapping application obtains a set of audio navigation instructions for navigating a user from a starting location to a destination location along a route. For example, a user may request navigation directions from the user's current location to a destination location via the mapping application, and the client device may forward the request to a navigation server. The navigation server may then generate a set of audio navigation instructions and transmit the set of audio navigation instructions to the client device for playback to the user.

Additionally, the mapping application may communicate with other applications executing on the client device (e.g., via an API), or other devices within the vicinity of the client device (e.g., a short-range communication link), such as the vehicle head unit or other client devices. The communications may include indications of the media content playing by the other applications/devices and may include characteristics of the media content, such as the language of the media content, the rate of speech of the media content, a transcript of the media content, characteristics of the voice of the speaker of the media content, etc. In addition to communicating with other applications/devices to identify media content, the mapping application may compare ambient audio playing within the area to a set of audio fingerprints for popular media content, such as popular songs, radio programs, podcasts, etc. to identify the media content.

In any event, the mapping application may transmit the characteristics of the media content to a server device to analyze the characteristics of the media content and determine how to adjust the audio navigation directions in accordance with the media content. The server device may then transmit the adjusted audio navigation directions or indications of how to adjust the playback of the audio navigation directions to the client device. In other implementations, the mapping application may determine how to adjust the audio navigation directions in accordance with the media content.

Media content, as used herein, may include radio shows, podcasts, audio books, music, advertisements, television programs, movies, videos, or any other types of media including an audio component. While the audio navigation directions described herein includes driving directions to the destination via a vehicle, the audio navigation directions may be for any suitable mode of transportation such as walking, biking, public transit, etc.

Example Hardware and Software Components

Figure 1:
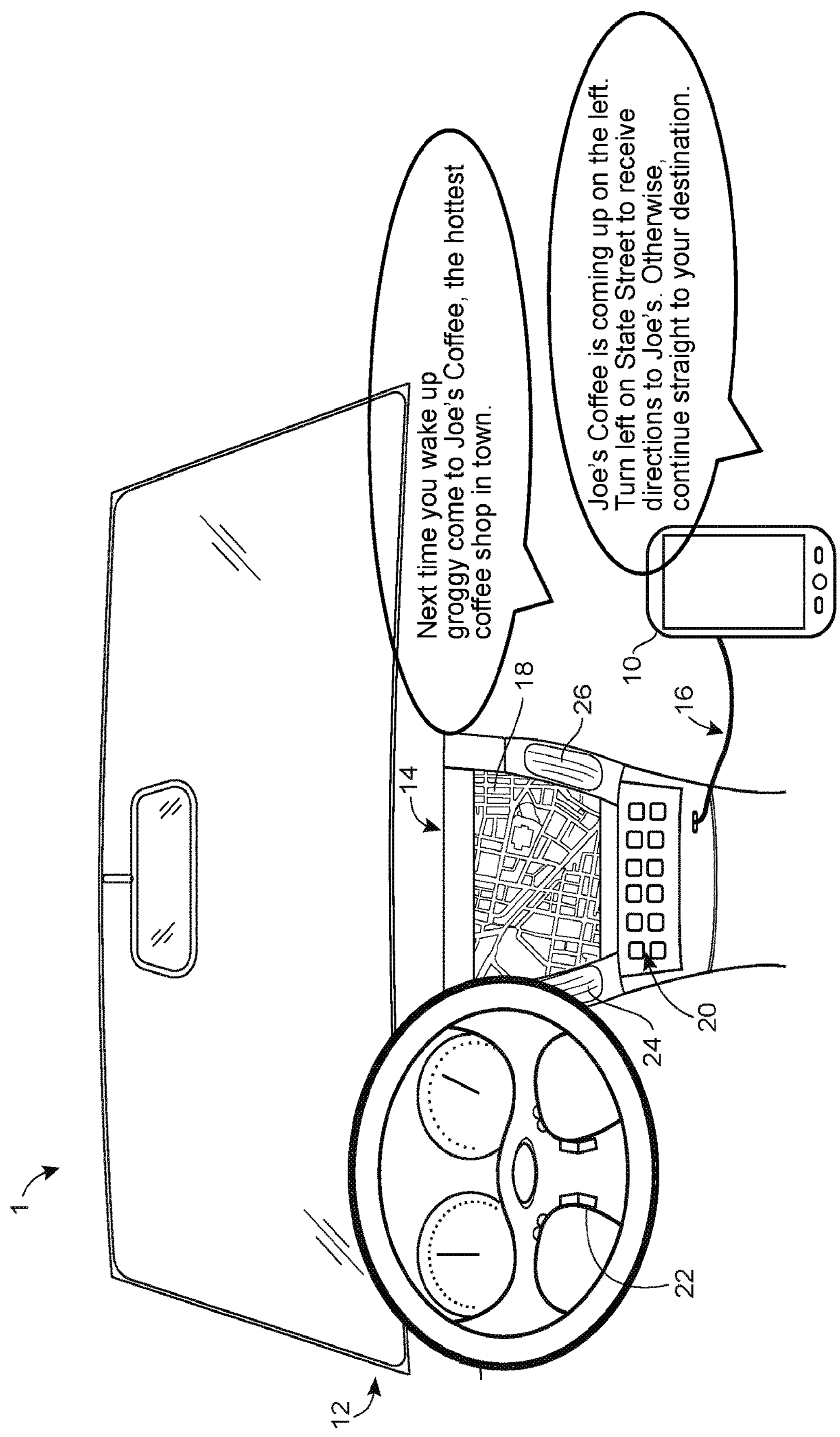
FIG. 1 illustrates an example vehicle in which the techniques of the present disclosure can be used to generate content-aware audio navigation instructions.

Referring to FIG. 1, an example environment 1 in which the techniques outlined above can be implemented includes a portable device 10 and a vehicle 12 with a head unit 14. The portable device 10 may be a smart phone, a tablet computer, or an in-vehicle navigation system, for example. The portable device 10 communicates with the head unit 14 of the vehicle 12 via a communication link 16, which may be wired (e.g., Universal Serial Bus (USB)) or wireless (e.g., Bluetooth, Wi-Fi Direct). The portable device 10 also can communicate with various content providers, servers, etc. via a wireless communication network such as a fourth- or third-generation cellular network (4G or 3G, respectively).

The head unit 14 can include a display 18 for presenting navigation information such as a digital map. The display 18 in some implementations is a touchscreen and includes a software keyboard for entering text input, which may include the name or address of a destination, point of origin, etc. Hardware input controls 20 and 22 on the head unit 14 and the steering wheel, respectively, can be used for entering alphanumeric characters or to perform other functions for requesting navigation directions. The head unit 14 also can include audio input and output components such as a microphone 24 and speakers 26, for example. The speakers 26 can be used to play the audio instructions sent from the portable device 10.

Figure 2:
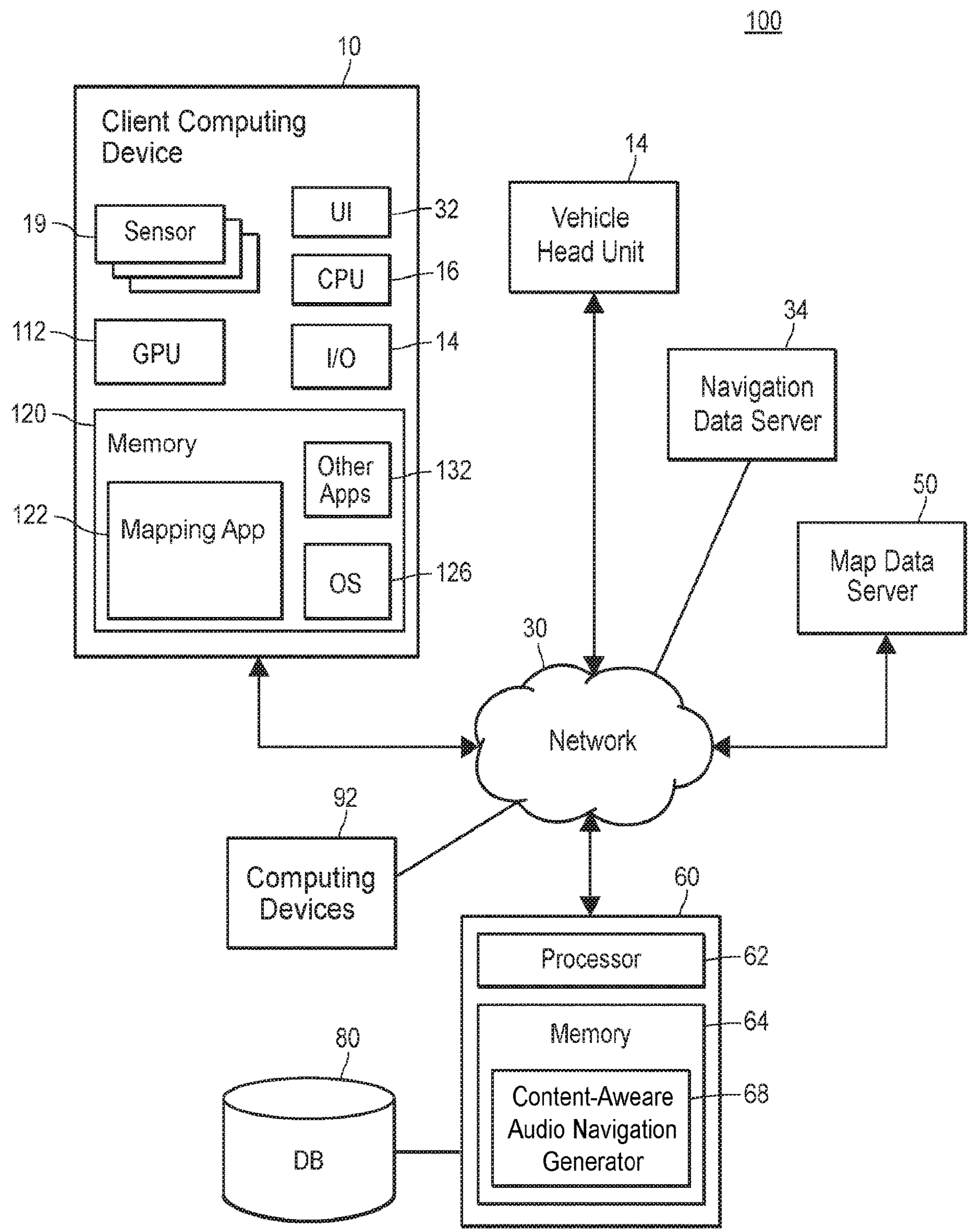
FIG. 2 is a block diagram of an example system in which techniques for generating content-aware audio navigation instructions can be implemented.

An example communication system 100 in which a content-aware audio navigation generation system can be implemented is illustrated in FIG. 2. The communication system 100 includes a client device 10 configured to execute a geographic application 122, which also can be referred to as a "mapping application 122." Depending on the implementation, the application 122 can display an interactive digital map, request and receive routing data to provide driving, walking, or other navigation directions including audio navigation directions, provide various geolocated content, etc. The client device 10 may be operated by a user (also referred to herein as a "driver") displaying a digital map while navigating to various locations. The communication system 100 also includes a vehicle head unit 14 which may communicate with the client device 10, via a short-range communication link such as Bluetooth, Wi-Fi Direct, etc. Furthermore, the communication system 100 may include other computing devices 92 within the vicinity of the client device 10 which may communicate with the client device 10, via a short-range communication link such as Bluetooth, Wi-Fi Direct, etc. For example, when the client device 10 is a driver's smart phone, the other computing devices 92 may include smart phones of passengers within the vehicle, or a tablet or wearable device of the driver.

In addition to the client device 10, the communication system 100 includes a server device 60 configured to provide content-aware audio navigation instructions to the client device 10. The server device 60 can be communicatively coupled to a database 80 that stores, in an example implementation, a machine learning model for adjusting audio navigation instructions for particular media/audio content. The training data may include sets of audio navigation instructions previously provided to users, characteristics of media content playing when the audio navigation instructions were presented, indications of adjustments made by the user to the audio navigation instructions, and/or self-reported indications regarding the users' satisfaction with the audio navigation instructions. The training data is described in further detail below with reference to FIG. 3. Additionally, the database 80 may store sets of rules for adjusting the audio navigation parameters.

More generally, the server device 60 can communicate with one or several databases that store any type of suitable geospatial information or information that can be linked to a geographic context. The communication system 100 also can include a navigation data server 34 that provides driving, walking, biking, or public transit directions, for example. Further, the communication system 100 can include a map data server 50 that provides map data to the server device 60 for generating a map display. The devices operating in the communication system 100 can be interconnected via a communication network 30.

In various implementations, the client device 10 may be a smartphone or a tablet computer. The client device 10 may include a memory 120, one or more processors (CPUs) 116, a graphics processing unit (GPU) 112, an I/O module 14 including a microphone and speakers, a user interface (UI) 32, and one or several sensors 19 including a Global Positioning Service (GPS) module. The memory 120 can be a non-transitory memory and can include one or several suitable memory modules, such as random access memory (RAM), read-only memory (ROM), flash memory, other types of persistent memory, etc. The I/O module 114 may be a touch screen, for example. In various implementations, the client device 10 can include fewer components than illustrated in FIG. 2 or conversely, additional components. In other embodiments, the client device 10 may be any suitable portable or non-portable computing device. For example, the client device 10 may be a laptop computer, a desktop computer, a wearable device such as a smart watch or smart glasses, etc.

The memory 120 stores an operating system (OS) 126, which can be any type of suitable mobile or general-purpose operating system. The OS 126 can include application programming interface (API) functions that allow applications to retrieve sensor readings. For example, a software application configured to execute on the computing device 10 can include instructions that invoke an OS 126 API for retrieving a current location of the client device 10 at that instant. The API can also return a quantitative indication of how certain the API is of the estimate (e.g., as a percentage).

The memory 120 also stores a mapping application 122, which is configured to generate interactive digital maps and/or perform other geographic functions, as indicated above. The mapping application 122 can receive navigation instructions, audio navigation instructions, and/or audio navigation instruction parameters and present the audio navigation instructions according to the audio navigation instruction parameters. The mapping application 122 also can display driving, walking, biking or public transit directions, and in general provide functions related to geography, geolocation, navigation, etc.

It is noted that although FIG. 2 illustrates the mapping application 122 as a standalone application, the functionality of the mapping application 122 also can be provided in the form of an online service accessible via a web browser executing on the client device 10, as a plug-in or extension for another software application executing on the client device 10, etc. The mapping application 122 generally can be provided in different versions for different respective operating systems. For example, the maker of the client device 10 can provide a Software Development Kit (SDK) including the mapping application 122 for the Android™ platform, another SDK for the iOS™ platform, etc.

In addition to the mapping application 122, the memory 120 stores other client applications 132, such as music applications, video applications, streaming applications, radio applications, social media applications, etc. which play media/audio content. These applications 132 may expose APIs for communicating with the mapping application 122.

In some implementations, the server device 60 includes one or more processors 62 and a memory 64. The memory 64 may be tangible, non-transitory memory and may include any types of suitable memory modules, including random access memory (RAM), read-only memory (ROM), flash memory, other types of persistent memory, etc. The memory 64 stores instructions executable on the processors 62 that make up a content-aware audio navigation generator 68, which can obtain characteristics of media/audio content presented within the vicinity of the client device 10 and adjust audio navigation instructions within the set of audio navigation directions in accordance with the characteristics of the media/audio content. In some implementations, the content-aware audio navigation generator 68 may generate a machine learning model for adjusting audio navigation instructions for particular media/audio content. The content-aware audio navigation generator 68 may also receive a request for navigation directions for a user from a starting location to a destination. The content-aware audio navigation generator 68 may then retrieve a set of audio navigation directions and provide the set of audio navigation directions to the client device 10 which are then presented by the mapping application 122 via a speaker 26.

The content-aware audio navigation generator 68 and the mapping application 122 can operate as components of a content-aware audio navigation generation system. Alternatively, the content-aware audio navigation generation system can include only server-side components and simply provide the mapping application 122 with instructions to present the audio navigation instructions. In other words, content-aware audio navigation generation techniques in these embodiments can be implemented transparently to the mapping application 122. As another alternative, the entire functionality of the content-aware audio navigation generator 68 can be implemented in the mapping application 122.

For simplicity, FIG. 2 illustrates the server device 60 as only one instance of a server. However, the server device 60 according to some implementations includes a group of one or more server devices, each equipped with one or more processors and capable of operating independently of the other server devices. Server devices operating in such a group can process requests from the client device 10 individually (e.g., based on availability), in a distributed manner where one operation associated with processing a request is performed on one server device while another operation associated with processing the same request is performed on another server device, or according to any other suitable technique. For the purposes of this discussion, the term "server device" may refer to an individual server device or to a group of two or more server devices.

In operation, the mapping application 122 operating in the client device 10 receives and transmits data to the server device 60. Thus, in one example, the client device 10 may transmit a communication to the content-aware audio navigation generator 68 (implemented in the server device 60) requesting navigation directions from a starting location to a destination. Accordingly, the content-aware audio navigation generator 68 may generate a set of audio navigation instructions. Then prior to playing an audio navigation instruction for an upcoming maneuver, the client device 10 may transmit characteristics of media/audio content playing within the vicinity of the client device 10 to the content-aware audio navigation generator 68 and/or an indication of the audio navigation instruction. The content-aware audio navigation generator 68 may determine how to adjust the audio navigation instruction based on the media/audio content and may transmit an adjusted audio navigation instruction or data for adjusting the audio navigation instruction to the client device 10. In other implementations, the client device 10 may transmit characteristics of media/audio content playing within the vicinity of the client device 10 to the content-aware audio navigation generator 68 before the content-aware audio navigation generator 68 generate the set of audio navigation instructions. The content-aware audio navigation generator 68 may then generate the set of audio navigation instructions in view of the characteristics of the media/audio content.

In some embodiments, the content-aware audio navigation generator 68 generates and provides each adjusted audio navigation instruction individually to the client device 10. In other embodiments, the content-aware audio navigation generator 68 generates and provides a set of text-based navigation instructions to the client device 10. Then for each text-based navigation instruction, the content-aware audio navigation generator 68 receives characteristics of media/audio content playing within the vicinity of the client device 10 and generates and provides audio navigation instruction parameters for the text-based navigation instruction to the client device 10. As a result, the client device 10 generates and presents an audio navigation instruction according to the audio navigation instruction parameters. The audio navigation instruction parameters may include the language for the audio navigation instruction, the rate of speech for the audio navigation instruction, the timing for when to present the audio navigation instruction, etc.

Also in some embodiments, the content-aware audio navigation generator 68 generates and provides a set of text-based navigation instructions including multiple versions of the same navigation instruction to the client device 10 (e.g., a first version of the navigation instruction in English, a second version of the navigation instruction in Spanish, a third version of the navigation instruction telling the user to turn left in 1000 meters, a fourth version of the navigation instruction telling the user to turn left in 500 meters in the event that the instruction is delayed until the end of a segment or sentence of the media content, etc.). Then for each navigation instruction, the content-aware audio navigation generator 68 generates and provides audio navigation instruction parameters for the navigation instruction to the client device 10. As a result, the client device 10 presents the version of the navigation instruction that corresponds to the audio navigation instruction parameters.

The content-aware audio navigation generator 68 may adjust audio navigation parameters for multiple navigation instructions based on the media content, such as adjusting the language for each of the remaining navigation instructions based on the language of the media content. Additionally, the content-aware audio navigation generator 68 may adjust audio navigation parameters for individual navigation instructions based on the media content, such as adjusting the timing for an individual navigation instruction to play the individual navigation instruction after a particular sentence or segment in the media content.

The content-aware audio navigation generator 68 may adjust the audio navigation parameters based on a set of pre-stored rules. For example, the pre-stored rules may include a first rule to adjust the language for the audio navigation instructions based on the language of at least one segment of the media content, at least a threshold number of segments of the media content, or at least a threshold amount of time for the media content. By adjusting the language of the audio navigation instructions to match the language of media content, user comprehension of the audio navigation instructions is improved, thereby improving user safety. The pre-stored rules may also include a second rule to adjust the rate of speech of the audio navigation instructions based on the rate of speech of at least one segment of the media content, at least a threshold number of segments of the media content, or at least a threshold amount of time for the media content. Again, by adjusting the rate of speech of the audio navigation instructions to more closely align with the rate of speech of media content, user comprehension and safety is improved.

Furthermore, the pre-stored rules may include a third rule to adjust the timing of an audio navigation instruction, such that the audio navigation instruction is played after the end of a sentence or segment of the media content. By playing audio navigation instructions after the end of a sentence of segment of media content, the audio navigation instructions are more easily understood as there is no sudden break in the flow of content. This also therefore improves user comprehension and safety. In some implementations, the pre-stored rules may determine the complexity level of the audio navigation instruction, the urgency level in which the audio navigation instruction must be played before reaching the location for the maneuver, and the relevance level for the media content.

For example, the relevance level for the media content may be low when the media content is music, but may be high when the media content is an audio tour of the city that the user is driving in or when the media content is an instructional video on how to perform a task that the user is planning to perform upon arriving at the destination. The pre-stored rules may compare the complexity level of the audio navigation instruction, the urgency level in which the audio navigation instruction must be played before reaching the location for the maneuver, and/or the relevance level for the media content to determine when and how to interrupt the media content to play the audio navigation instruction.

For example, when the urgency level in which the audio navigation instruction must be played is high, the pre-stored rules may indicate interrupting the media content even when the relevance level for the media content is high. This ensures that urgent navigation instructions are still played if necessary. On the other hand, when the urgency level in which the audio navigation instruction must be played is medium or low, and the relevance level for the media content is high, the pre-stored rules may indicate waiting until the end of a sentence or segment in the media content to play the audio navigation instruction or may indicate lowering the volume of the media content or increasing the volume of the audio navigation instruction while simultaneously playing the audio navigation instruction with the media content. In another example, when the complexity level is high and the relevance level is high, the pre-stored rules may indicate playing the audio navigation instruction multiple times, once after the end of a first sentence or segment and a second time after the end of a second sentence or segment. The repeated playing of complex instructions, at specific instances to avoid interrupting media content unnaturally, improves user safety as the user is provided with the instructions at clear points and multiple times. In yet another example, when the complexity level exceeds the relevance level, the pre-stored rules may indicate playing the audio navigation instruction immediately. On the other hand, when the relevance level exceeds the complexity level, the pre-stored rules may indicate not playing the audio navigation instruction or waiting to play the audio navigation instruction until the end of a sentence or segment.

To play the audio navigation instruction after the end of a sentence or segment of the media content, the client device 10 analyzes a current audio stream of the media content using speech property classification and/or natural language processing models, as described in more detail below, to identify specific markers in the media content (e.g., the end of a sentence, end of a segment, etc.). The client device 10 may continue to analyze the current audio stream in real-time or near real-time until the end of a sentence or segment is identified using the speech property classification and/or natural language processing models. Then when the end of a sentence or segment is identified, the client device 10 may play the audio navigation instruction.

The audio navigation instruction may also be adjusted to account for the time delay in waiting until the end of the sentence or segment to play the audio navigation instruction. For example, initially the audio navigation instruction may be, "In 100 meters, turn left." However, after the end of the sentence the user may be 50 meters from the location for the maneuver, and accordingly the audio navigation instruction may be adjusted to, "In 50 meters, turn left." To adjust the audio navigation instruction to account for the time delay, the audio navigation instruction may initially be generated with a variable distance, such as "In X meters, turn left." The mapping application 122 may determine the distance at the time the audio navigation instruction is presented as the distance between the current location of the user and the location for the maneuver and may replace "X" with the determined distance or may round the determined distance up or round to the nearest 50 meters, 100 meters, 500 meters, etc. By doing this, the accuracy of the audio navigation instructions isn't compromised due to the delaying of the output of the audio navigation instructions. As such, the method described herein avoids unnaturally interrupting media content with audio navigation instructions, without compromising the accuracy of audio navigation instructions. This improves the comprehension of the audio navigation instructions, improving user safety.

Additionally, the client device 10 may adjust the manner in which the electronic media content is presented in accordance with the one or more audio navigation directions. More specifically, the client device 10 may pause the media content or adjust the volume of the media content for example, when the media content is playing from an application executing on the client device 10 (e.g., by communicating with the application via an API). In another example, when the media content is playing from another device communicatively coupled to the client device 10 (e.g., via a short-range communication link), the client device 10 may transmit a request to the other device to pause the media content or adjust the volume of the media content playing on the other device. This may cause the other device to pause or adjust the volume of the media content. A pausing of the media content beneficially avoids both media content and audio navigation instructions playing simultaneously, thereby ensuring that the clarity of the audio navigation instructions is not affected by the media content. Similarly, reducing the volume of the media content, for example, aids the user in hearing and understanding the audio navigation instructions. Both of these concepts therefore improve user safety.

Still further, the pre-stored rules may include a fourth rule to identify POIs included in the media content or other geographical topics discussed in the media content (e.g., ancient Rome), and determine whether the POIs are within a threshold radius of a waypoint along the route. If a POI is within a threshold radius of a waypoint along the route, the pre-stored rules may indicate playing information about the POI such as, "If you're interested, on the left is a Roman archaeological site." Additionally or alternatively, the pre-stored rules may indicate providing a suggestion to the user to navigate to the POI such as, "Joe's Coffee is about a mile down to the left. Would you like navigation directions there?" Then if the user indicates they would like navigation directions to Joe's Coffee, the content-aware audio navigation generator 68 may generate a set of audio navigation directions from the user's current location to Joe's Coffee.

Moreover, the pre-stored rules may include a fifth rule to determine characteristics of the voice of the speaker of the media content, for example, when the media content is an audio book or podcast. Then the pre-stored rules may identify a voice for playing the audio navigation instructions which is distinguishable from the speaker of the media content, so that the user is alerted when an audio navigation instruction is presented. The pre-stored rules may select a voice recording from a set of predetermined voice recordings by comparing characteristics of the voice of the speaker (e.g., the pitch, tone, and/or frequency of the voice) to characteristics of each of the voice recordings, and identify the voice recording which is the least similar to the voice of the speaker. By identifying a voice for playing the audio navigation instructions which is distinguishable from the voice of the speaker of the media content, the audio navigation instructions are more easily understood by a user.

In addition or as an alternative to adjusting the audio navigation parameters based on a set of pre-stored rules, the content-aware audio navigation generator 68 may generate a machine learning model for adjusting audio navigation instructions for particular media/audio content. To generate the machine learning model, the content-aware audio navigation generator 68 obtains training data including sets of audio navigation instructions previously provided to users, characteristics of media content playing when the audio navigation instructions were presented, indications of adjustments made by the user to the audio navigation instructions, and/or self-reported indications regarding the users' satisfaction with the audio navigation instructions.

For example, users who select an option to share location data and/or other user data may transmit sets of audio navigation instructions presented by their respective client devices 10 along with characteristics of media content playing when the audio navigation instructions were presented.

The characteristics of the media content may include the language of the media content, the rate of speech of the media content, characteristics of the voice of the speaker of the media content, a transcript of the media content, the length of the media content, a title of the media content, a type of the media content (e.g., a podcast, an audio book, a song, etc.), POIs or other geographical topics mentioned within the media content, etc. In some implementations, the client device 10 determines the characteristics of the media content by communicating with the source of the media content (e.g., via a short-range communication link or an API). In other implementations, the client device 10 determines the characteristics of the media content by analyzing ambient audio fingerprints within the area.

For example, users may select an option to allow the mapping application 122 to analyze ambient audio within the area if the ambient audio is identified as electronic media content. The client device 10 and more specifically, the mapping application 122 may first identify that media content is playing from another source different from the mapping application by communicating with other applications 132 executing on the client device 10 or other computing devices 92 within communication range of the client device 10. The mapping application 122 may also identify that media content is playing by comparing audio fingerprints of predetermined media/audio content to ambient audio fingerprints in the surrounding area.

For example, the mapping application 122 may obtain a library of audio fingerprints corresponding to media/audio content from popular music, audio books, radio shows, podcasts, etc. The mapping application 122 may extract fingerprints from the ambient audio, identify features of the ambient audio fingerprints, and may compare features of the ambient audio fingerprints to features of audio fingerprints from predetermined media/audio content for example, using machine learning techniques. The machine learning techniques may include linear regression, polynomial regression, logistic regression, random forests, boosting, nearest neighbors, Bayesian networks, neural networks, support vector machines, or any other suitable machine learning technique. For example, frequencies, pitches, tones, amplitudes, etc., may be stored as audio fingerprint features. Features may be identified for an entire song, podcast, audio book, etc., or for individual segments of the media content (e.g., every 8 second segment). Then each of these audio fingerprint features for the predetermined media/audio content may be compared to the features of the ambient audio fingerprints.

In some embodiments, the audio fingerprint features for the predetermined media/audio content may be compared to the features for the ambient audio fingerprints using a nearest neighbor algorithm. The nearest neighbors algorithm may identify audio fingerprint features for predetermined media/audio content which are the closest to the features of the ambient audio fingerprints. The mapping application 122 may then determine that the ambient audio includes electronic media content when the ambient audio fingerprint features match with or have more than a threshold amount of similarity with the audio fingerprint features for one of the songs, audio books, radio shows, podcasts, etc. in the predetermined media/audio content. The mapping application 122 may also determine that the ambient audio is the particular song, audio book, radio show, podcast, etc. in the predetermined media/audio content that matches with or has more than a threshold amount of similarity with the ambient audio fingerprints.

The mapping application 122 may then identify characteristics of the ambient audio based on the characteristics of the matching song, audio book, radio show, podcast, etc. from the predetermined media/audio content. In other implementations, such as when the mapping application 122 does not identify a matching song, audio book, radio show, podcast, etc. from predetermined media/audio content using audio fingerprinting techniques, the mapping application 122 may run content analysis models including speech recognition, speaker identification, speech property classification, and natural language processing models over the audio stream of the media content. These models may include neural networks or any other suitable type of machine learning models which analyze characteristics of the audio stream and compare the characteristics to training data to identify the speaker, terms mentioned in the audio stream such as POIs or other geographical topics, specific markers in the media content (e.g., the end of a sentence, end of a segment, etc.), the language of the media content, the speech rate of the media content, etc.

For example, the models may be trained using training data including audio streams from several speakers, where characteristics of the audio streams (e.g., the pitch, tone, frequency, amplitude, etc.) are classified according to the respective speakers. The mapping application 122 may analyze the audio stream of the media content to identify characteristics of the audio stream and apply the characteristics to the model to identify a speaker from the several speakers having similar characteristics.

In another example, the models may be trained using training data including audio streams in several languages, where characteristics of the audio streams are classified according to the respective languages. The mapping application 122 may analyze the audio stream of the media content to identify characteristics of the audio stream and apply the characteristics to the model to identify a language from the several languages having similar characteristics.

In yet another example, the models may be trained using training data including audio streams where particular terms, phrases, sentences, etc. are spoken, and where characteristics of the audio streams are classified according to the respective terms, phrases, sentences, etc. The mapping application 122 may analyze the audio stream of the media content to identify characteristics of the audio stream and apply the characteristics to the model to identify a term, phrase, sentence, etc. from the several terms, phrases, sentences, etc. having similar characteristics.

In any event, for each audio navigation instruction or set of audio navigation instructions presented, the content-aware audio navigation generator 68 may obtain the characteristics of the media content playing at the time in which the audio navigation instruction(s) was/were presented. Additionally, the content-aware audio navigation generator 68 may obtain indications of adjustments made by the user to the audio navigation instructions, such as changing the language, changing the rate of speech, changing the volume, muting the audio navigation instructions, requesting an audio navigation instruction be repeated, etc. Also in some embodiments, the content-aware audio navigation generator 68 may obtain a self-reported indication regarding the user's satisfaction with the audio navigation instruction as additional training data. For example, the mapping application 122 may include a user control to indicate dissatisfaction with an audio navigation instruction and/or a text field for the user to explain her dissatisfaction. In this manner, the machine learning model can generate audio navigation instructions that are more likely to be followed and less likely to annoy or disturb the user.

The sets of audio navigation instructions, audio navigation instruction parameters, media content characteristics, user adjustments to the audio navigation instruction parameters, and/or indications of whether a user was satisfied with an audio navigation instruction may be provided as training data for generating the machine learning model using machine learning techniques. In some embodiments, separate machine learning models may be generated for each audio navigation instruction parameter. For example, one machine learning model may be generated for determining the language for an audio navigation instruction. Another machine learning model may be generated for determining the timing of providing the audio navigation instruction. Yet another machine learning model may be generated for determining the rate of speech for the audio navigation instruction.

FIG. 3 illustrates example data 300 that may be used for adjusting audio navigation instructions for particular media/audio content. In some embodiments, the content-aware audio navigation generator 68 may apply the data 300 to the set of pre-stored rules to adjust the audio navigation instruction. The data 300 may include media/audio content characteristics 310 and audio navigation instruction parameters 320. The media/audio content characteristics 310 may include a transcript of the media content, the rate of speech of the media content, the language of the media content, POIs included in the media content, the length of the media content, a relevance level for the media content, the title of the media content, the type of the media content, characteristics of the voice of the speaker of the media content, etc.

The transcript of the media content may include the text of the media content as well as indications of points in time where there is a pause in the media content, such as the end of a sentence, end of a segment, the beginning of the next sentence, the beginning of the next segment, etc.

The relevance level of the media content may be a relevance score such as from 1 to 100, may be a category such as "Very Low," "Low," "Medium," "High," "Very High," etc., or may be indicated in any other suitable manner. The relevance level for the media content may be determined based on the subject matter of the media content, the current location of the user, and/or the destination location for the audio navigation directions. For example, the relevance level may be high when the media content is an audio tour of the city that the user is driving in or when the media content is an instructional video on how to perform a task that the user may perform at the destination.

The type of the media content may include a radio show, podcast, audio book, music, advertisement, television program, movie, video, etc. The characteristics of the voice of the speaker may include the pitch, tone, frequency, or any other suitable characteristics of the speaker's voice.

While the example media/audio content characteristics 310 may include a transcript of the media content, the rate of speech of the media content, the language of the media content, POIs included in the media content, the length of the media content, a relevance level for the media content, the title of the media content, the type of the media content, characteristics of the voice of the speaker of the media content, etc., these are merely a few examples of media/audio content characteristics 310 for ease of illustration only. Any suitable media/audio content characteristics 310 may be used, and a subset of the described characteristics 310 may be used.

The audio navigation instruction parameters 320 may include the maneuver type, the location of the maneuver, the complexity level of the maneuver, the urgency level for playing the audio navigation instruction, the language for the audio navigation instruction, the rate of speech of the audio navigation instruction, the voice for the audio navigation instruction, the timing of audio navigation instruction, and/or the volume of the audio navigation instruction.

The complexity level of the maneuver may be a complexity score such as from 1 to 100, may be a category such as "Very Low," "Low," "Medium," "High," "Very High," etc., or may be indicated in any other suitable manner. The complexity level for a maneuver may be determined based on the maneuver type, such as a turn in a four-way intersection, a turn in a six-way intersection, a roundabout, a U-turn, a highway merge, a highway exit, etc. The complexity level may also be determined based on the amount of time or distance between the upcoming maneuver and the previous maneuver. Maneuvers which occur shortly after previous maneuvers may have higher complexity levels. Furthermore, the complexity level may be determined based on the number of lanes that the user needs to change to perform the maneuver. For example, the mapping application 122 may compare an initial lane for the user after performing the previous maneuver to a final lane for the user to perform the upcoming maneuver. The complexity level may increase as the number of lane changes increases for performing the maneuver.

The urgency level for playing the audio navigation instruction may be an urgency score such as from 1 to 100, may be a category such as "Very Low," "Low," "Medium," "High," "Very High," etc., or may be indicated in any other suitable manner. The urgency level for a maneuver may be determined based on the amount of distance and/or time until the user has to perform the maneuver. For example, the urgency score may be inversely related to the amount of time and/or distance until the user has to perform the user. The urgency level may be higher when the maneuver is 200 meters away from the user's current location than when the maneuver is 1 mile away from the user's current location.

The timing of the audio navigation instruction may include when to present the audio navigation instruction, such as when the user is halfway between the location of the previous maneuver and the location of the subsequent maneuver. The volume may be indicated in decibels (dB) or categorized as low volume (e.g., below a first threshold decibel amount), medium volume (e.g., between the first threshold decibel amount and a second threshold decibel amount that is higher than the first threshold decibel amount), high volume (e.g., above the second threshold decibel amount), etc.

While the example audio navigation instruction parameters 320 may include the maneuver type, the location of the maneuver, the complexity level of the maneuver, the urgency level for playing the audio navigation instruction, the language for the audio navigation instruction, the rate of speech of the audio navigation instruction, the voice for the audio navigation instruction, the timing of audio navigation instruction, the volume of the audio navigation instruction, etc., these are merely a few examples of audio navigation instruction parameters 320 for ease of illustration only. Any suitable audio navigation instruction parameters 320 may be used, and a subset of the described parameters 320 may be used.

The data 300 also includes indications of adjustments to the audio navigation instructions based on the media content characteristics and/or the audio navigation instruction parameters. The content-aware audio navigation generator 68 may determine the adjustments to the audio navigation instructions by applying the pre-stored rules to the media content characteristics and/or the audio navigation instruction parameters. In other scenarios, the adjustments may be manual adjustments from the user selecting user controls.

For example, in response to Joe's Coffee being included in an advertisement, the content-aware audio navigation generator 68 may communicate with the map data server 50 to determine the locations of Joe's Coffee establishments and compare the locations to waypoints along the route of the navigation directions. If there is a Joe's Coffee within a threshold radius of one of the waypoints along the route, the content-aware audio navigation generator 68 may add a recommendation to the user to take a detour to Joe's Coffee to the set of audio navigation directions. In another example, in response to the rate of speech of a podcast being at 1.5×, the content-aware audio navigation generator 68 may increase the rate of speech of the audio navigation instructions to 1.5×, and may adjust the timing of an upcoming audio navigation instruction to play after the end of a sentence in the podcast. In yet another example, in response to the media content including music in Spanish, the content-aware audio navigation generator 68 may change the language of the audio navigation instructions to Spanish. In another example, in response to the rate of speech of a podcast being at 2× in Hebrew, the content-aware audio navigation generator 68 may increase the rate of speech of the audio navigation instructions to 2× and may change the language of the audio navigation instructions to Hebrew.

In other embodiments, the data 300 may be training data used to generate the machine learning model. In some embodiments, the training data 300 may be stored in the database 80. In addition to media/audio content characteristics 310 and audio navigation instruction parameters 320, the training data 300 may include data indicative of the driver's response to the audio navigation instruction. The data indicative of the driver's response to the audio navigation instruction may include adjustments made by the user to the audio navigation instructions, such as changing the language, changing the rate of speech, changing the volume, muting the audio navigation instructions, requesting an audio navigation instruction be repeated, etc. The data indicative of the driver's response to the audio navigation instruction may include a self-reported indication regarding the user's satisfaction with the audio navigation instruction as additional training data.

To generate the machine learning model, the content-aware audio navigation generator 68 may classify subsets of the training data 300 as corresponding to various adjustments to the audio navigation instructions. Some subsets may be classified in multiple adjustment categories, such as the last entry of the training data set 300 which includes adjustments to the rate of speech and language of the audio navigation instructions.

Then the content-aware audio navigation generator 68 may analyze the subsets to generate the machine learning model. The machine learning model may be generated using various machine learning techniques such as a regression analysis (e.g., a logistic regression, linear regression, or polynomial regression), k-nearest neighbors, decisions trees, random forests, boosting, neural networks, support vector machines, deep learning, reinforcement learning, Bayesian networks, etc. In some embodiments, the content-aware audio navigation generator 68 may generate a first machine learning model for determining the language for the audio navigation instructions. The content-aware audio navigation generator 68 may generate a second machine learning model for determining the rate of speech for the audio navigation instructions. The content-aware audio navigation generator 68 may generate a third machine learning model for determining the timing of providing an audio navigation instruction, a fourth machine learning model for identifying a voice recording for the audio navigation instructions, and a fifth machine learning model for determining POIs to reference in the audio navigation instructions.

For example, a machine learning model for determining the timing of providing an audio navigation instruction may be a decision tree having several nodes connected by branches where each node represents a test on the media/audio content characteristics and/or audio navigation instruction parameters (e.g., is the relevance level of the media content high?), each branch represents the outcome of the test (e.g., Yes), and each leaf represents the adjustments to the timing of the audio navigation instructions (e.g., play immediately, play after the end of a sentence in the media content, play after the end of a segment of the media content, etc.).

More specifically, the content-aware audio navigation generator 68 may generate a decision tree where a first node corresponds to whether the urgency level of the audio instruction is high. If the urgency level is not high, a first branch may connect to a second node which corresponds to whether the media content has more than 10 seconds remaining. If the media content has more than 10 seconds remaining, a second branch may connect to a third node which corresponds to whether the relevance level is high. If the relevance level is high, a third branch may connect to a leaf node which may indicate that the audio navigation instruction should be presented after the end of a sentence in the media content. While the decision tree includes one leaf node and three branches, this is merely an example for ease of illustration only. Each decision tree may include any number of nodes, branches, and leaves, having any suitable number and/or types of tests on the media/audio content characteristics and/or audio navigation instruction parameters.

In any event, the content-aware audio navigation generator 68 may identify adjustments to the audio navigation instructions for particular media/audio content using pre-stored rules or machine learning techniques, as described above. In some instances, the content-aware audio navigation generator 68 may then generate adjusted audio navigation instructions. As has been described, such changes improve the clarity of the audio navigation instructions by avoiding conflict or otherwise distinguishing over other media content. For example, when the content-aware audio navigation generator 68 determines to change the language from English to Spanish, the content-aware audio navigation generator 68 may obtain a set of Spanish audio navigation directions from the starting location to the destination location, and provide the Spanish audio navigation directions to the client device 10. In another example, when the content-aware audio navigation generator 68 adds an additional recommendation to look to the right to view a particular monument mentioned in the media content, the content-aware audio navigation generator 68 may provide the additional recommendation to the client device 10.

In other instances, the content-aware audio navigation generator 68 may provide instructions to the client device 10 to adjust parameters for the audio navigation instructions. For example, when the content-aware audio navigation generator 68 determines to change the rate of speech to 1.5×, the content-aware audio navigation generator 68 may send an instruction to the client device 10 to change the rate of speech to 1.5×, and the client device 10 may play the audio navigation instructions at 1.5×. In another example, when the content-aware audio navigation generator 68 determines to play the audio navigation instruction at a particular point in time such as at the end of a sentence or segment in the media content, the content-aware audio navigation generator 68 may send an instruction to the client device 10 to wait to play the audio navigation instruction until the end of the sentence or segment in the media content. Then the client device 10 may analyze the audio stream of the media content to determine when a sentence or segment has ended and then play the audio navigation instruction. As mentioned above, the content-aware audio navigation generator 68 can be implemented in the server device 60 or the client device 10. In scenarios where the content-aware audio navigation generator 68 is implemented on the client device 10, the content-aware audio navigation generator 68 may provide instructions to a text-to-speech (TTS) engine executing on the client device 10 to adjust parameters for the audio navigation instructions.

Example Methods for Presenting Content-Aware Audio Navigation Instructions

Figure 4:
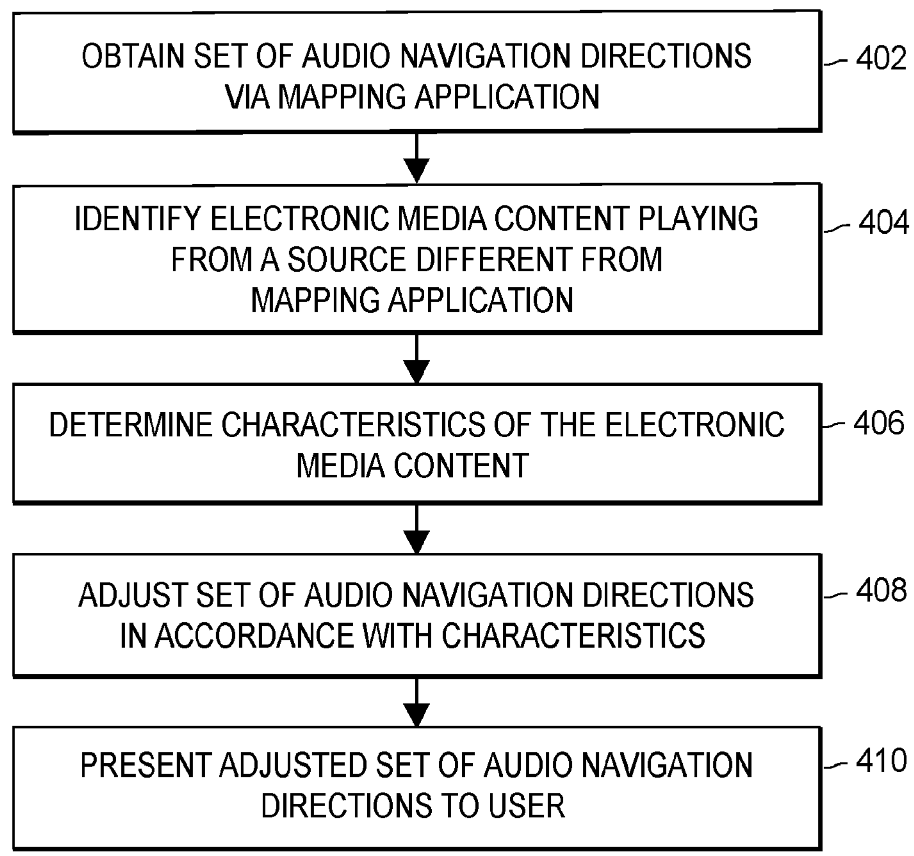
FIG. 4 is a flow diagram of an example method for generating content-aware audio navigation instructions, which can be implemented in a client computing device.

FIG. 4 illustrates a flow diagram of an example method 400 for generating content-aware audio navigation instructions. The method can be implemented in a set of instructions stored on a computer-readable memory and executable at one or more processors of the client device 10. For example, at least some of the steps of the method can be implemented by the mapping application 122.

At block 402, a set of audio navigation directions are obtained via a mapping application 122 for navigating a user from a starting location to a destination location along a route. For example, a user may request navigation directions from the user's current location to a destination location via the mapping application 122, and the client device 10 may forward the request to a navigation server 34. The navigation server 34 may then generate a set of audio navigation instructions and transmit the set of audio navigation instructions to the client device 10 for playback to the user.

Then at block 404, electronic media content is identified which is playing from a source different from the mapping application. The source may be another application 132 executing on the client device 10 or may be another computing device 92 within the vicinity of the client device 10. To identify the electronic media content, the mapping application 122 may communicate with other applications 132 executing on the client device (e.g., via an API), or other computing devices 92 within the vicinity of the client device 10 (e.g., via a short-range communication link), such as the vehicle head unit 14 or other client devices. The communications may include indications of the electronic media content playing by the other applications/devices 92, 132 and may include characteristics of the electronic media content, such as the language of the electronic media content, the rate of speech of the electronic media content, a transcript of the electronic media content, characteristics of the voice of the speaker of the electronic media content, etc. (block 406).

In addition to communicating with other applications/devices to identify media content, the mapping application 122 may compare ambient audio playing within the area, which may have been captured by a microphone of the client device 10, to a set of audio fingerprints for popular media content, such as popular songs, radio programs, podcasts, etc. to identify the electronic media content. Once the electronic media content is identified, the mapping application 122 may identify characteristics of the electronic media content by running content analysis models including speech recognition, speaker identification, speech property classification, and natural language processing models over the audio stream of the electronic media content (block 406). These models may include neural networks or any other suitable type of machine learning models which analyze characteristics of the audio stream and compare the characteristics to training data to identify the speaker, terms mentioned in the audio stream such as POIs, specific markers in the media content (e.g., the end of a sentence, end of a segment, etc.), the language of the media content, the speech rate of the media content, etc.

In any event, the set of audio navigation directions may then be adjusted in accordance with the characteristics of the electronic media content (block 408). More specifically, in some implementations the set of audio navigation directions may be adjusted using a set of pre-stored rules. For example, the pre-stored rules may include a first rule to adjust the language for the audio navigation instructions based on the language of at least one segment of the media content, at least a threshold number of segments of the media content, or at least a threshold amount of time for the media content. The pre-stored rules may also include a second rule to adjust the rate of speech of the audio navigation instructions based on the rate of speech of at least one segment of the media content, at least a threshold number of segments of the media content, or at least a threshold amount of time for the media content.

Furthermore, the pre-stored rules may include a third rule to adjust the timing of an audio navigation instruction, such that the audio navigation instruction is played after the end of a sentence or segment of the media content. Still further, the pre-stored rules may include a fourth rule to identify POIs included in the media content, and determine whether the POIs are within a threshold radius of a waypoint along the route. If a POI is within a threshold radius of a waypoint along the route, the pre-stored rules may indicate playing information about the POI such as, "If you're interested, on the left is a Roman archaeological site." Additionally or alternatively, the pre-stored rules may indicate providing a suggestion to the user to navigate to the POI such as, "Joe's Coffee is about a mile down to the left. Would you like navigation directions there?"

Moreover, the pre-stored rules may include a fifth rule to determine characteristics of the voice of the speaker of the media content, for example, when the media content is an audio book or podcast. Then the pre-stored rules may identify a voice for playing the audio navigation instructions which is distinguishable from the speaker of the media content, so that the user is alerted when an audio navigation instruction is presented.

In addition to or as an alternative to adjusting the audio navigation parameters based on a set of pre-stored rules, the mapping application 122 may generate a machine learning model for adjusting audio navigation instructions for particular media/audio content. The mapping application 122 may then apply the characteristics of the electronic media content and/or parameters for an audio navigation instruction to the machine learning model to identify adjustments to the audio navigation instruction.

The mapping application 122 may then generate adjusted audio navigation instructions. For example, when the mapping application 122 determines to change the language from English to Spanish, the mapping application 122 may obtain a set of Spanish audio navigation directions from the starting location to the destination location. In other instances, the mapping application 122 may provide instructions to the TTS engine to adjust parameters for the audio navigation instructions.

In other implementations, to adjust the set of audio navigation directions in accordance with the characteristics of the electronic media content, the client device 10 may transmit the set of audio navigation directions, characteristics of the electronic media content, and/or audio navigation instruction parameters to the server device 60. The server device 60, and more specifically, the content-aware audio navigation generator 68 may obtain a set of pre-stored rules for adjusting the set of audio navigation direction or may generate a machine learning model for adjusting audio navigation instructions for particular media/audio content. The content-aware audio navigation generator 68 may apply the characteristics of the electronic media content and/or audio navigation instruction parameters to the set of pre-stored rules or the machine learning model to identify adjustments to the audio navigation instructions. The server device 60 may then transmit the adjusted audio navigation directions or indications of how to adjust the playback of the audio navigation directions to the client device 10. Beneficially, by using the server device 60 to identify the adjustments to the audio navigation instructions, instead of the client device 10, resources of the client device 10 are saved since the processing, time and power consumption for performing this task are those of the server device 60. Additionally, moving this step to the server device 60 allows the process to be performed more efficiently, particularly in real-time scenarios, as the processing power of the server device 60 may exceed that of the client device 60, thereby allowing the adjustments to be identified more quickly.

Then at block 410, the adjusted audio navigation directions are presented to the user, for example via a speaker.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The method 400 may include one or more function blocks, modules, individual functions or routines in the form of tangible computer-executable instructions that are stored in a non-transitory computer-readable storage medium and executed using a processor of a computing device (e.g., a server device, a personal computer, a smart phone, a tablet computer, a smart watch, a mobile computing device, or other client computing device, as described herein). The method 400 may be included as part of any backend server (e.g., a map data server, a navigation server, or any other type of server computing device, as described herein), client computing device modules of the example environment, for example, or as part of a module that is external to such an environment. Though the figures may be described with reference to the other figures for ease of explanation, the method 400 can be utilized with other objects and user interfaces. Furthermore, although the explanation above describes steps of the method 400 being performed by specific devices (such as a server device 60 or client device 10), this is done for illustration purposes only. The blocks of the method 400 may be performed by one or more devices or other parts of the environment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for providing content-aware audio navigation instructions through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for generating content-aware navigation instructions, the method comprising:

obtaining, by one or more processors in a client device via a mapping application, one or more audio navigation directions for traversing from a starting location to a destination location along a route;

identifying, by the one or more processors, electronic media content playing from a source different from the mapping application, the source executing at the client device or in proximity with the client device;

determining, by the one or more processors, characteristics of the electronic media content including at least one of: a rate of speech of the electronic media content, a transcript of the electronic media content, a length of the electronic media content, or a point of interest (POI) or geographical topic which is included in the electronic media content;

adjusting, by the one or more processors, at least one of the one or more audio navigation directions in accordance with the characteristics of the electronic media content; and presenting, by the one or more processors, the at least one adjusted audio navigation direction to the user.

2. The method of claim 1, wherein adjusting at least one of the one or more audio navigation directions includes at least one of:

adjusting a timing in which the at least one audio navigation direction is presented, adjusting a language in which the at least one audio navigation direction is presented, adjusting a speed at which the at least one audio navigation direction is presented, or providing a recommendation for a point of interest (POI) along the route.

3. The method of claim 1, wherein adjusting at least one of the one or more audio navigation directions in accordance with the characteristics of the electronic media content includes:

determining, by the one or more processors, a complexity level the at least one audio navigation direction;

determining, by the one or more processors, a relevance level for the electronic media content;

comparing, by the one or more processors, the complexity level of at least one audio navigation direction to the relevance level for the electronic media content; and determining, by the one or more processors, whether to present the at least one audio navigation direction based on the comparison.

4. The method of claim 3, wherein determining whether to present the at least one audio navigation direction based on the comparison includes:

in response to determining that the complexity level of the at least one audio navigation direction exceeds the relevance level for the electronic media content, presenting, by the one or more processors, the at least one audio navigation direction.

5. The method of claim 3, wherein determining whether to present the at least one audio navigation direction based on the comparison includes:

in response to determining that the relevance level for the electronic media content exceeds the complexity level of the navigation instruction, not presenting, by the one or more processors, the at least one audio navigation direction.

6. The method of claim 1, wherein identifying electronic media content playing from a source different from the mapping application includes at least one of:

obtaining, by the one or more processors, audio playback data from an audio application executing on the client device which is different from the mapping application;

obtaining, by the one or more processors, audio playback data from a device communicatively coupled to the client device; or comparing, by the one or more processors, ambient audio fingerprints to one or more audio fingerprints of predetermined media content.

7. The method of claim 1, wherein adjusting the at least one audio navigation direction includes:

identifying, by the one or more processors, an end of a sentence in the electronic media content; and presenting, by the one or more processors, the at least one audio navigation direction after the end of the sentence.

8. The method of claim 1, further comprising:

adjusting, by the one or more processors, a manner in which the electronic media content is presented in accordance with the one or more audio navigation directions.

9. The method of claim 1, wherein adjusting the at least one audio navigation direction in accordance with the characteristics of the electronic media content includes at least one of:

adjusting the at least one audio navigation direction by applying the characteristics of the electronic media content to a set of pre-stored rules; or generating a machine learning model for adjusting audio navigation instructions for particular electronic media content, and adjusting the at least one audio navigation direction by applying the characteristics of the electronic media content to the machine learning model.

10. A client device for generating content-aware navigation instructions, the client device comprising:

a speaker;

one or more processors; and a non-transitory computer-readable memory coupled to the one or more processors and the speaker and storing instructions thereon that, when executed by the one or more processors, cause the client device to:

obtain, via a mapping application, one or more audio navigation directions for traversing from a starting location to a destination location along a route;

identify electronic media content playing from a source different from the mapping application, the source executing at the client device or in proximity with the client device;

determine characteristics of the electronic media content including at least one of: a rate of speech of the electronic media content, a transcript of the electronic media content, a length of the electronic media content, or a point of interest (POI) or geographical topic which is included in the electronic media content;

adjust at least one of the one or more audio navigation directions in accordance with the characteristics of the electronic media content; and present, via the speaker, the at least one adjusted audio navigation direction to a user.

11. The client device of claim 10, wherein to adjust the at least one audio navigation direction, the instructions cause the client device to at least one of:

adjust a timing in which the at least one audio navigation direction is presented, adjust a language in which the at least one audio navigation direction is presented, adjust a speed at which the at least one audio navigation direction is presented, or provide a recommendation for a point of interest (POI) along the route.

12. The client device of claim 10, wherein to adjust the at least one audio navigation direction in accordance with the characteristics of the electronic media content, the instructions cause the client device to:

determine a complexity level of the at least one audio navigation direction;

determine a relevance level for the electronic media content;

compare the complexity level of the at least one audio navigation direction to the relevance level for the electronic media content; and determine whether to present the at least one audio navigation direction based on the comparison.

13. The client device of claim 12, wherein to determine whether to present the at least one audio navigation direction based on the comparison, the instructions cause the client device to:

in response to determining that the complexity level of the at least one audio navigation direction exceeds the relevance level for the electronic media content, present the at least one audio navigation direction.

14. The client device of claim 10, wherein to identify electronic media content playing from a source different from the mapping application, the instructions cause the client device to at least one of:

obtain audio playback data from an audio application executing on the client device which is different from the mapping application;

obtain audio playback data from a device communicatively coupled to the client device; or compare ambient audio fingerprints to one or more audio fingerprints of predetermined media content.

15. The client device of claim 10, wherein to adjust the at least one audio navigation direction the instructions cause the client device to:

identify an end of a sentence in the electronic media content; and present the at least one audio navigation direction after the end of the sentence.

16. The client device of claim 10, wherein the instructions further cause the client device to:

adjust a manner in which the electronic media content is presented in accordance with the one or more audio navigation directions.

17. A non-transitory computer-readable memory storing instructions thereon that, when executed by one or more processors, cause the one or more processors to:

obtain, via a mapping application, one or more audio navigation directions for traversing from a starting location to a destination location along a route;

identify electronic media content playing from a source different from the mapping application, the source executing at the client device or in proximity with the client device;

determine characteristics of the electronic media content including at least one of: a rate of speech of the electronic media content, a transcript of the electronic media content, a length of the electronic media content, or a point of interest (POI) or geographical topic which is included in the electronic media content;

present, via a speaker, the at least one adjusted audio navigation directions to a user.

18. The non-transitory computer-readable memory of claim 17, wherein to adjust the at least one audio navigation direction, the instructions cause the one or processors to at least one of:

adjust a timing in which the at least one audio navigation direction is presented, adjust a language in which the at least one audio navigation direction is presented, adjust a speed at which the at least one audio navigation direction is presented, or provide a recommendation for a point of interest (POI) along the route.

* * * * *